United States Patent
Cocchi et al.

(10) Patent No.: US 6,592,096 B2
(45) Date of Patent: Jul. 15, 2003

(54) SAFETY DEVICE FOR TAPS FOR PASTEURIZING MACHINES

(75) Inventors: Gino Cocchi, Bologna (IT); Roberto Lazzarini, Reggio Emilia (IT)

(73) Assignee: Ali S.p.A. (IT)

( * ) Notice: Subject to any disclaimer, the term of this patent is extended or adjusted under 35 U.S.C. 154(b) by 0 days.

(21) Appl. No.: 10/077,850

(22) Filed: Feb. 20, 2002

(65) Prior Publication Data

US 2002/0130285 A1 Sep. 19, 2002

(30) Foreign Application Priority Data

Mar. 16, 2001 (IT) .................................. GE2001 0004 U

(51) Int. Cl.[7] .............................. F16K 1/20; F16K 1/50
(52) U.S. Cl. .......................................... 251/99; 251/101
(58) Field of Search ..................................... 251/89–116

(56) References Cited

U.S. PATENT DOCUMENTS

| | | | |
|---|---|---|---|
| 3,115,159 A | | 12/1963 | Yasui |
| 4,809,948 A | * | 3/1989 | Gardner et al. ............. 251/107 |
| 4,844,115 A | * | 7/1989 | Bowers ........................ 251/93 |
| 5,439,197 A | * | 8/1995 | Itoi et al. ..................... 251/95 |
| 6,079,448 A | * | 6/2000 | Lee ............................. 251/104 |
| 6,105,930 A | * | 8/2000 | Nishimura et al. ......... 251/102 |

FOREIGN PATENT DOCUMENTS

| | | |
|---|---|---|
| EP | 0 089 481 | 9/1983 |
| FR | 2 611 848 | 9/1988 |

* cited by examiner

Primary Examiner—Paul J. Hirsch
(74) Attorney, Agent, or Firm—Larson & Taylor, PLC

(57) ABSTRACT

Safety device for taps provided with a disk shutter sliding in a tubular sector shaped like the arc of a circle, constituting the product outlet duct of a pasteurizing machines used in the production of creams, soups or the like. The shutter disk is connected with an operating lever endowed with a spring pin fitting into suitable hollows obtained on an element with circular sector which is concentric with respect to the rotation axis of said operating lever. Both on the operating lever and in the element with circular sector showing the hollows defining the basic positions of the operating operating lever of the shutter, reciprocal abutment means have been provided, whose purpose is to interrupt the movement of the operating lever on reaching said intermediate position in which a radial opening for product discharge is opened, thus preventing the unintentional overcoming of said position.

4 Claims, 2 Drawing Sheets

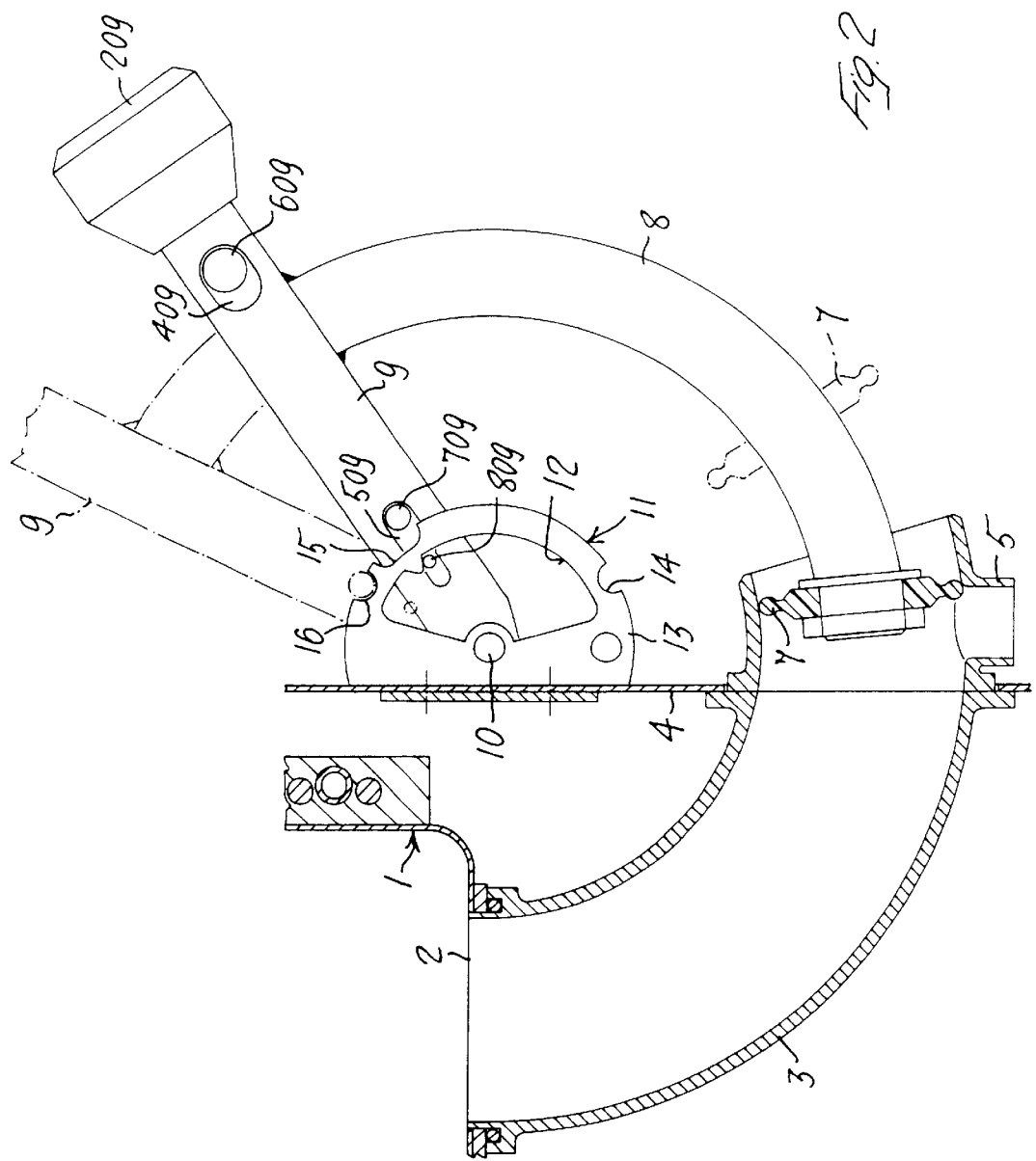

SAFETY DEVICE FOR TAPS FOR PASTEURIZING MACHINES

BACKGROUND AND SUMMARY OF THE INVENTION

The present invention relates to a safety device for taps provided with a disk shutter sliding in a tubular sector shaped like the arc of a circle, constituting the product outlet duct of pasteurizing machines used in the production of creams, soups or the like.

In such known taps the shutter disk is connected by means of a curved bar with an operating lever endowed with a spring pin fitting into suitable hollows formed on an element with circular sector which is concentric with respect to the rotation axis of said operating lever.

Such pin can be lifted from said hollows by exerting onto it a traction in an axial direction with respect to the operating lever, then the operating lever can be freely rotated around its hinging axis, thus allowing the shutter disk to slide within the aforesaid tubular sector from a position in which it fully closes up the tubular sector, thus avoiding the product discharge, to an intermediate position in which a radial outlet for the discharge of liquid products builds up, and further to a position in which it is completely taken out of the outlet tubular sector, thus enabling the discharge of dense products such as creams.

The problem related to these known taps consists in that, when the operating lever of the tap shutter is rotated with the operating handle of the stopping pin being pulled, there is no means allowing the operating lever to stop its stroke on the radial hole for product extraction (said hole being oriented downwards), so that it can always occur that the operator, being inexperienced or simply careless, turns the operating lever pulling the shutter too much until the latter gets out of the outlet tubular sector, thus freeing the end outlet (which is oriented towards the operator) and risking serious consequences for the operator who could be struck by a gush of hot liquid.

Therefore, the main aim of the present invention is to provide a safety device associated with said operating operating lever, which should avoid that, due to an incorrect operation, the tap shutter is fully taken out from the tubular duct within which it slides.

According to the main characteristic of the present invention said object is obtained by providing, both on the operating lever and in the element with tubular sector containing the hollows defining the basic positions of the shutter operating lever, abutment means suitable to stop the movement of the operating lever in correspondence of said intermediate opening position of the radial outlet for product discharge, thus avoiding the unintentional overcoming of such position.

BRIEF DESCRIPTION OF THE DRAWINGS

Further objects and advantages of the present invention will be evident from the following description of a preferred embodiment of the invention, made with reference to the enclosed drawings, in which:

FIG. 2 is a view wholly similar to the one of FIG. 1, showing with a full line the compulsory stop position of the shutter element in the product discharge station, and with a hatched and dotted line the position of complete extraction of the shutter element from the tubular duct, which is reached after overcoming said compulsory stop position.

DESCRIPTION OF THE PREFERRED EMBODIMENT OF THE INVENTION

Figure 1:
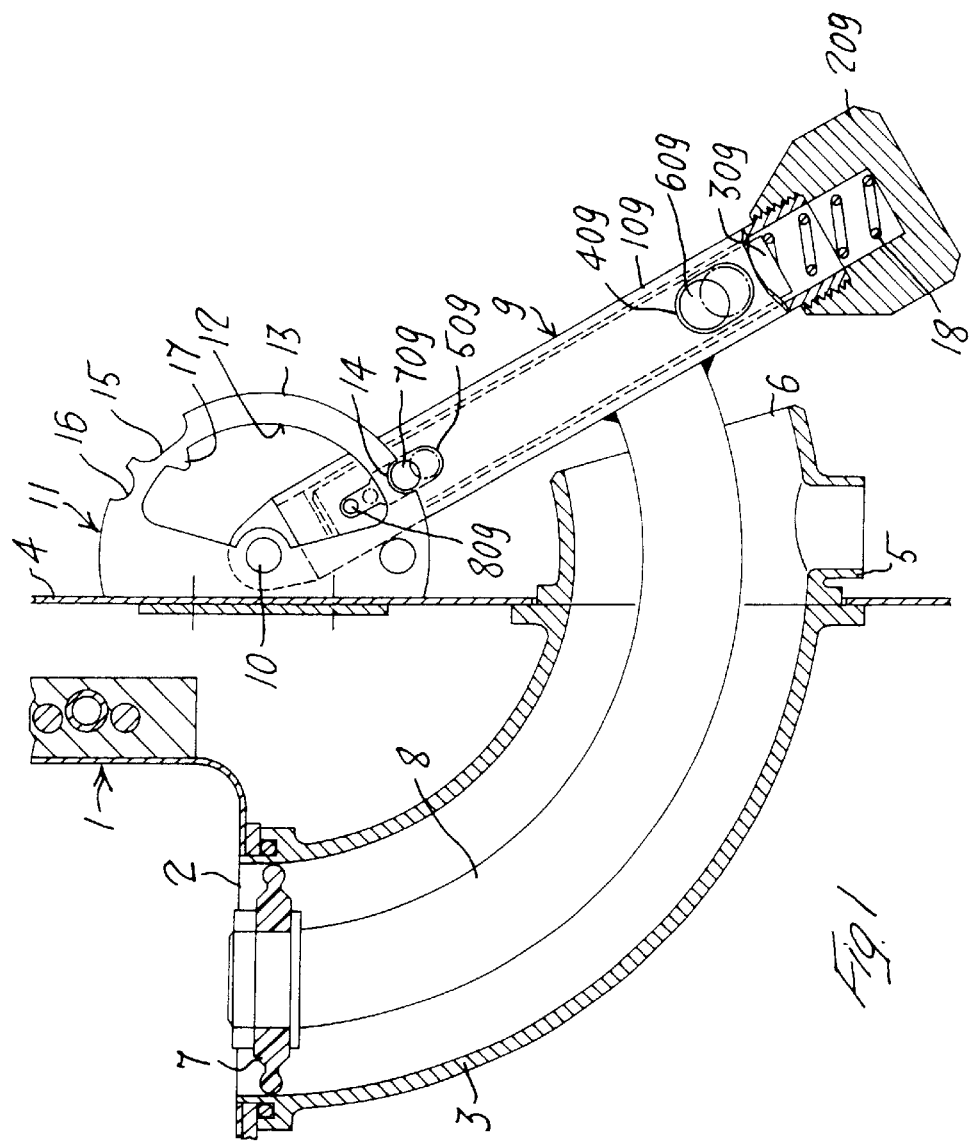
FIG. 1 is a view in longitudinal section of the tap according to the invention, with the shutter element in the shuttering position of the outlet from the pasteurizing tank.

With reference to the drawings, and in particular to FIG. 1, the numeral 1 indicates a portion of the bottom of a pasteurizing tank, in which the outlet 2 for the pasteurized product is formed. Said outlet 2 is sealingly connected to a curved tubular duct 3 projecting, with its free end, beyond the front wall 4 of the case of the pasteurizing machine. Near its free end, the duct 3 is provided with a short radial duct 5 pointing downwards, said duct being a first outlet for the processed product, downstream from which the duct 3 ends with the outlet 6. Within said duct 3 the disk shutter 7 is slidingly mounted. Said shutter 7 comprises a plastic or rubber disk having the same diameter as the inner diameter of the duct 3 and being fastened to one end of a curved stem 8 whose radius of curvature is the same as the one of duct 3, which takes the whole length of the duct 3 and which, on its other end protruding beyond the outlet 6 of the duct 3, is secured to an operating lever 9 pivoted in 10 to a support element 11 fastened to the wall 4 of the machine.

The support element 11 consists of a semicircular plate provided with a wide central opening with a semicircular peripheral inner rim 12 which is parallel to the semicircular peripheral outer rim 13 of the element 11. The outer rim 13 shows two semicircular notches 14 and 16 and an elongated notch 15, whose purpose will be described later, whereas from the inner rim 12, on the center line of notch 15, a tooth 17 radially protrudes towards the center.

The operating lever 9 comprises an outer tubular element 109 pivotably connected at one end to the pin 10 and having on the other end a handle 209, and a coaxial tubular element 309 mounted so that it can slide telescopically within the element 109. The outer tubular element 109 is provided in its upper portion with a pair of elongated first slots 409, diametrically opposed, whereas in its lower portion it is provided, substantially on the same level as the semicircular element defined by the inner and outer rims 12 and 13 of the element 11 of a second elongated slot 509 going with its ends beyond said inner and outer rims 12 and 13 respectively.

The coaxial tubular element 309 is provided in its turn in correspondence of the first slots 409 with a pair of knob-shaped pins 609, radially protruding outwards beyond said first slots 409, and on the position corresponding to the second slot 509 with a first pin 709 radially protruding outwards beyond said second slot 509, said pin being suitable to engage into the notches 14, 15 and 16, and with a second pin 809, also radially protruding outwards, spaced from the pin 709 on the axis of the element 309 of a portion substantially corresponding to the distance between the inner and outer rims 12 and 13. The device is also provided with a compression helical spring 18 placed between the bottom of the knob 209 and the head of the tubular element 309.

The operation of the described device will now be evident.

With the operating lever 9 in the initial position indicated in FIG. 1 the shutter 7 closes up the outlet 2 for the discharge of the product from the tank 1.

If the product has to be discharged from the tank 1, the knob 209 of the operating lever 9 has to be grasped and a traction has to be exerted onto the two knobs 609. The element 309 is thus lifted, in opposition to the action of the spring 18, until the pin 709 gets out of the notch 14, thus enabling the rotation of the operating lever 9 around its fulcrum. However, this rotation motion is interrupted when the pin 809 comes into contact with the tooth 17, i.e. when the shutter element reaches the position shown in FIG. 2, in which the liquid flows through the outlet duct 5. In order to overcome the tooth 17, and therefore to take out the shutter completely from the duct 3 (position of the operating lever 9 and of the shutter 7 shown with a hatched and dotted line in FIG. 2), the knobs 609 have to be released, so that the pin 809 reaches such a position to overcome the tooth 17, and only after overcoming said tooth 17, by exerting again a traction on the knobs 609 the operating lever 9 is free to continue its full extraction stroke of the shutter 7 from the duct 3.

Thanks to the need for this double operation any unwanted going out of the shutter 7 from the duct 3 can be avoided.

What is claimed is:

1. A safety device for taps for pasteurizing tanks comprising a disk shutter, a tubular sector shaped like the arc of a circle communicating with said pasteurizing tank, said tubular sector being provided with a radial outlet, an operating lever connected to said shutter for moving said shutter along said tubular sector, a spring pin on said lever, a semi-circular element provided with a number of hollows cooperating with said pin, the semi-circular element being concentric with respect to the rotation axis of said operating lever, so that by lifting said pin from said hollows the said operating lever can be freely rotated around its hinging axis, thus sliding the shutter disk within said tubular sector from a position in which it closes up the communication between said tubular sector and the said pasteurizing tank, to an intermediate position in which the said radial outlet become opened, and further to a position in which it is completely taken out of the said tubular sector, wherein cooperating abutment means are provided both on the said operating lever and in the said semi-circular element provided with the said hollows defining the said positions of said operating lever of the said shutter, so as to stop the movement of the said operating lever on reaching said intermediate position in which said radial outlet for product discharge become opened.

2. A device according to claim 1, in which said semi-circular element consists of a semicircular plate provided with a wide central opening defining a semicircular peripheral inner rim which is parallel to the semicircular peripheral outer rim of the element, said outer rim showing two end semicircular notches and an intermediate elongated notch, whereas on the inner rim, on the center line of said elongated notch, a tooth is obtained, which radially protrudes towards the center.

3. A device according to the claim 2, in which said operating lever comprises an outer tubular element hinged on one end to the pin and having on its other end a knob, and a coaxial tubular element mounted so as to slide telescopically within said outer tubular element, said coaxial tubular element being provided in its upper portion with a pair of diametrically opposed, elongated first slots, whereas in its lower portion it is provided, substantially on the same level as the semicircular element defined by the rims of the said element with circular sectors, with a second elongated slot extending with its ends beyond said inner and outer rims respectively.

4. A device according to claim 3, in which said coaxial element is provided on said first slots with a pair of knob-shaped pins, radially protruding outwards beyond said first slots, and on correspondence of the said second slot it is provided with a first pin radially protruding outwards beyond said second slot, suitable to engage into said notches, and with a second pin also radially protruding outwards beyond said second slot, spaced from the said first pin by a distance substantially corresponding to the distance between said outer and inner rims, a compression helical spring being further provided between the bottom of the said knob and the head of the said tubular element.

* * * * *